US007152102B2

United States Patent
Brinton et al.

(10) Patent No.: US 7,152,102 B2
(45) Date of Patent: Dec. 19, 2006

(54) ON-LINE WIZARD ENTRY POINT MANAGEMENT COMPUTER SYSTEM AND METHOD

(75) Inventors: Matthew Robert Brinton, Everett, WA (US); Tomasz S. Kasperkiewicz, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 740 days.

(21) Appl. No.: 10/284,829

(22) Filed: Oct. 31, 2002

(65) Prior Publication Data

US 2004/0088394 A1   May 6, 2004

(51) Int. Cl.
*G06F 15/173*  (2006.01)
*G06F 15/16*  (2006.01)

(52) U.S. Cl. ...................................... 709/223; 709/229

(58) Field of Classification Search ............... 709/203, 709/219, 229, 238, 223
See application file for complete search history.

(56) References Cited

U.S. PATENT DOCUMENTS 6,725,272 B1 * 4/2004 Susai et al. ................ 709/229
6,728,748 B1 * 4/2004 Mangipudi et al. ......... 718/105
6,792,463 B1 * 9/2004 Lamberton et al. ......... 709/227
6,820,215 B1 * 11/2004 Harper et al. ................ 714/15
2002/0087612 A1 * 7/2002 Harper et al. ............... 709/100

* cited by examiner

*Primary Examiner*—Jason Cardone
*Assistant Examiner*—Minh-Chau N. Nguyen
(74) *Attorney, Agent, or Firm*—Shook, Hardy & Bacon LLP

(57) ABSTRACT

This invention is directed to a computer-implemented system and method for regulating the flow of users into an on-line wizard, thereby improving the experience of users entering the wizard. The flow is regulated by an on-line wizard manager that measures the load experienced by one or more servers associated with the on-line wizard. When new user requests to access the on-line wizard are received by the wizard manager, the manager determines whether access to the on-line wizard should be granted immediately or delayed for a period of time based upon the measured load on the servers. If a delay is warranted, the user is presented with information about the delay. After the delay period, the user is granted access to the on-line wizard.

20 Claims, 2 Drawing Sheets

ON-LINE WIZARD ENTRY POINT MANAGEMENT COMPUTER SYSTEM AND METHOD

CROSS-REFERENCE TO RELATED APPLICATIONS

Not Applicable.

STATEMENT REGARDING FEDERALLY SPONSORED RESEARCH OR DEVELOPMENT

Not Applicable.

TECHNICAL FIELD

The present invention relates generally to computer software, and more particularly, to a system and method for managing the flow into an on-line wizard.

BACKGROUND OF THE INVENTION

Wizards are now well known in the computer user environment. Broadly stated, a wizard is an interactive help utility that guides the user through each step of a particular task. Wizards can be used locally by an application, such as starting up a word processing document in the correct format for a business letter. Wizards are also useful in the on-line environment. In this on-line environment, the user is guided into the wizard by an on-line application. The on-line wizard is provided by the on-line service or application. Once the user accesses the on-line wizard, the user is presented with a series of pages according to the particular wizard steps.

The services provided by the on-line wizard provider can vary greatly. For example, many service providers exist that allow computer users to take advantage of web-based imaging services. These web-based imaging services generally involve taking an image existing on the user's PC and sending it to a remote location on the World Wide Web, through the Internet. The remote location then provides some type of service related to the image. Examples of web-based imaging services include remote storage, professional printing and photo gift creation. Once at the imaging service site, the on-line wizard guides the user through the necessary steps, such as photo selection, size, number etc.

A problem experienced by the service providers is based on the basic limitation of providing services on-line. These service providers attempt to estimate the maximum load placed on their servers by the user community. For example, for an imaging services provider, the maximum load might be expected shortly after a holiday season. Once the maximum load is estimated, the service provider can then purchase and maintain the number of servers needed to handle this load. But all of this estimation is not an exact science. If the load experienced by the service provider exceeds the maximum load that its servers can handle, the user experience can suffer.

If the load is above the maximum load capability of the servers, the system can become unstable and less reliable. As an example, if a user is at the service provider site and the system is already at or above the maximum load capability, the user is still presented with the on-line wizard for the site. Once within the wizard, the user can experience error messages, leading to a poor user experience. Given the number of options available to today's computer users, the possibility exists that the users will not return to that particular site. Continuing with the imaging services site, if the servers are in an over-loaded condition, the user may access the wizard initially, such as by a request for an indication of the pictures to be professionally printed. If the servers cannot handle the current load, the user may indicate the pictures and then wait. At some point, if a return message is not sent by the imaging service provider site, the wizard will time out and the user will see an error message.

One obvious solution to the problem is to purchase and maintain additional servers. Each server purchased adds not only the initial cost, but also the recurring maintenance costs as well. Moreover, this solution adds this expense to address an overload condition that may exist for only a short period of time.

A new system and method is needed that addresses the above-noted problems. The system and method should increase the stability and reliability of the service provided to the computer user. The user needs to experience fewer time-outs and server errors when at a service provider on-line wizard.

BRIEF SUMMARY OF THE INVENTION

This invention is directed to a computer-implemented system and method for managing the flow of users into an on-line wizard. The method involves monitoring the server load associated with the service providing the wizard. If the load exceeds a previously determined threshold, users attempting to access the wizard are placed in a queue. A wait time is also calculated for the user. The user is informed of the wait time. After the time has expired, the user is allowed into the wizard. Through this management, the users are informed on the front end of any needed wait. Once the wizard is accessed, the user experience will be better, due to the increased reliability provided by maintaining the server load below an overload condition.

Additional advantages and novel features of the invention will be set forth in the description which follows, and in part will become apparent to those skilled in the art upon examination of the following, or may be learned from practice of the invention.

BRIEF DESCRIPTION OF THE SEVERAL VIEWS OF THE DRAWING

These and other objectives and advantages of the present invention will be more readily apparent from the following detailed description of the drawings of the preferred embodiment of the invention that are herein incorporated by reference and in which.

DETAILED DESCRIPTION OF THE INVENTION

The present invention provides a computer-implemented system and method for managing the flow of users into an on-line wizard. The server load is monitored and compared to a previously determined threshold. Based on the current server load, users attempting to access the wizard may be placed in a queue. After a calculated wait time has expired, the user is allowed into the wizard.

Having briefly described an embodiment of the present invention, an exemplary operating environment for the present invention is described below.

Exemplary Operating Environment

Figure 1:
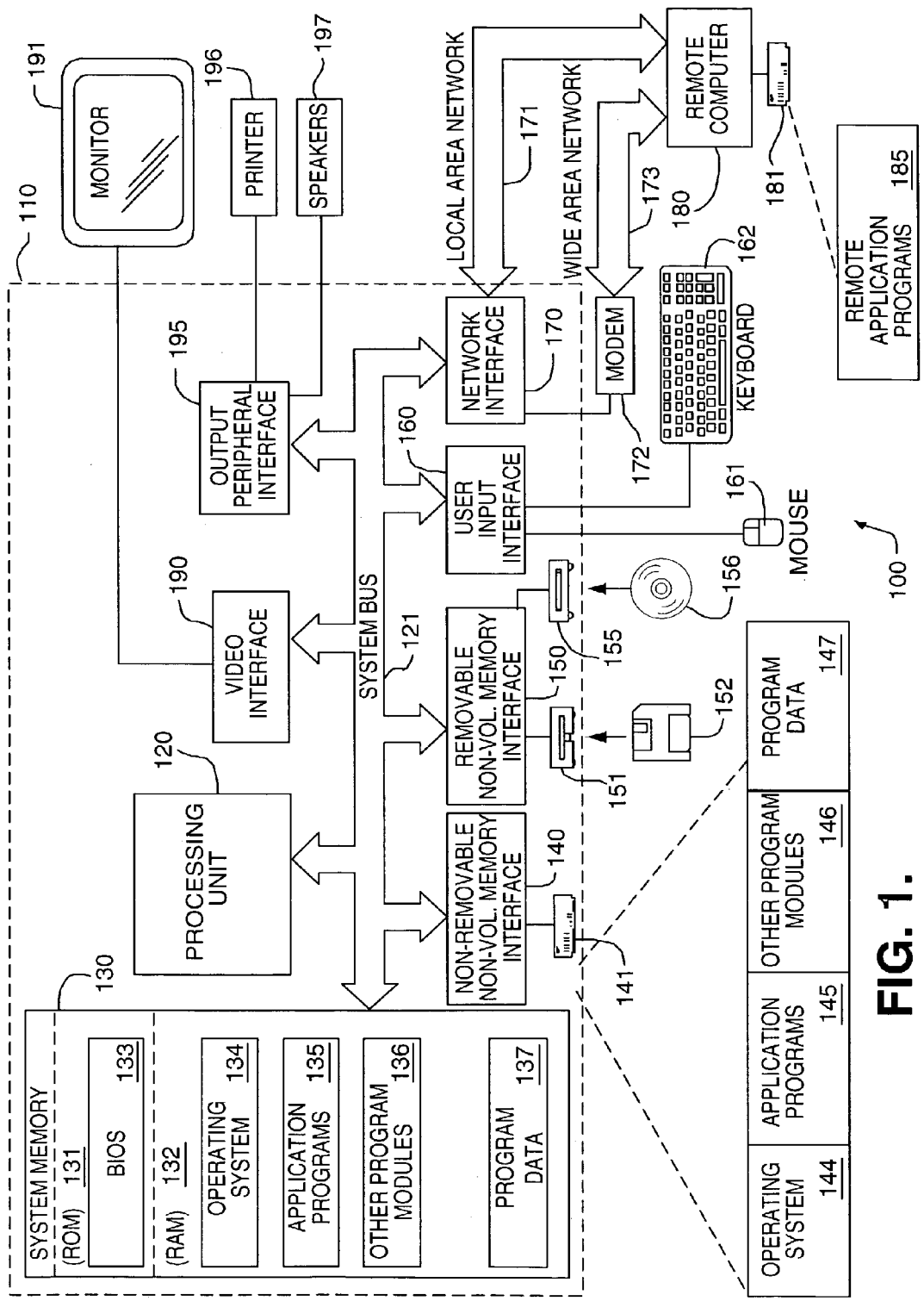
FIG. 1 is a block diagram of a computing system environment suitable for use in implementing the present invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention may be described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system 100 for implementing the invention includes a general purpose computing device in the form of a computer 110 including a processing unit 120, a system memory 130, and a system bus 121 that couples various system components including the system memory to the processing unit 120.

Computer 110 typically includes a variety of computer readable media. By way of example, and not limitation, computer readable media may comprise computer storage media and communication media. The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/nonremovable, volatile/nonvolatile computer storage media. By way of example only, FIG. 1 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 in the present invention will operate in a networked environment using logical connections to one or more remote computers, such as a remote computer 180. The remote computer 180 may be a personal computer, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed in connection with the present invention.

On-Line Wizard Manager

The on-line wizard manager of the present invention is used to manage the flow of users into an on-line wizard. The discussion below describes a general embodiment. It should be understood that the embodiment is useful in any of a number of different on-line environments. In particular, it is noted that the invention is useful in the on-line printing environment.

Figure 2:
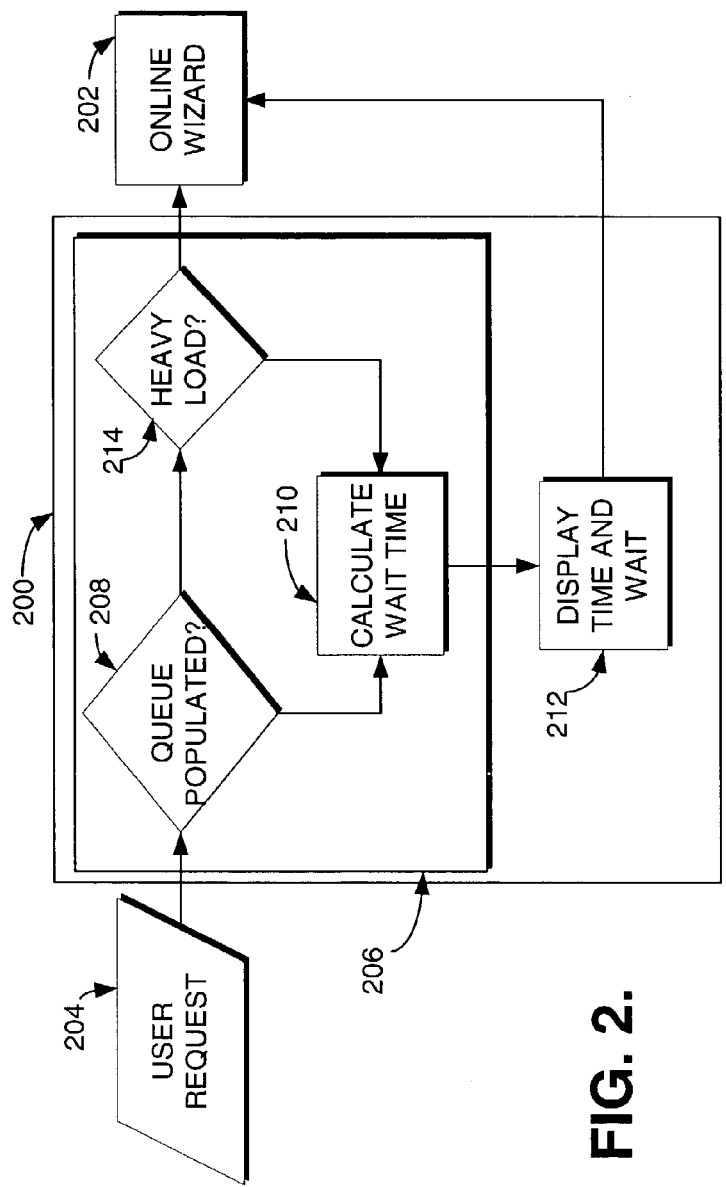
FIG. 2 is a schematic flow diagram representing the basic method of the present invention.
Figure 3:
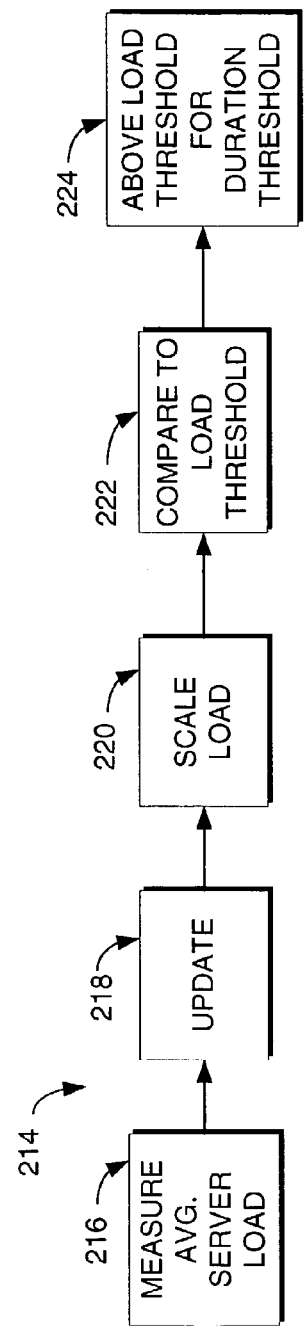
FIG. 3 is a schematic flow diagram representing the load measurement of FIG. 2.

An on-line wizard manager 200 incorporating the basic features of the present invention functions as shown in FIGS. 2 and 3. In use, a computer user requests access to a wizard 202, as shown at 204. In existing systems, the user is granted immediate access to the wizard. Under heavy server load conditions, this can result in the problems detailed above. The present invention uses an entry point 206 to determine the proper routing for the user request 204. The entry point 206 may allow immediate access to the wizard, or delayed access, based upon the current server load.

Upon receiving the user request 204, the on-line wizard manager 200 first determines if a waiting queue is currently populated, as shown at 208. In other words, the wizard manager determines if there is already a line of users waiting to get into the wizard 202. If the queue is already populated with one or more users, the on-line wizard manager routes the request to calculator 210. The queue operates on a first-in-first-out basis, so if the queue already exists, the entry point 206 places the request 204 at the end of the queue. The calculator 210 calculates the wait time for the user request 204. The wait time is calculated so as to allow a user access to the wizard every EntryPeriod seconds. The EntryPeriod is a time value that can vary based on the performance of the servers associated with the wizard 202. The EntryPeriod could be a small value, such as 0.1 seconds, or a larger value, such as 10 seconds, depending on the ability of the servers to handle new user requests. The correct value for the EntryPeriod is determined by performance testing and can be modified as needed. The wait time calculated by the calculator 210 is a function of the EntryPeriod along with the number of user requests 204 already in the queue as determined at 208. In other words, the wait time equals the EntryPeriod multiplied by the number of user requests 204 already in the queue, including the current user request under consideration. While the above-described algorithm is currently preferred for determining the wait time for a user, it should be understood that other algorithms could be used and are within the scope of the present invention.

The entry point 206 passes the calculated wait time to a wait page 212. The wait page 212 is a web page that is delivered to the user computer associated with the user request 204. In one embodiment, the wait page 212 is implemented as an HTML page with client-side JavaScript. The wait page 212 displays a message to the user indicating that the user has been placed in a first-in-first-out queue to access the wizard. Additionally, the user is informed of the calculated wait time. In one embodiment, the wait time is displayed to the user and is counted down on the wait page 212. After the wait time has expired, the script on the page directs the user request 204 to the wizard 202. If the user attempts to circumvent the wait page 212 by "refreshing" or by re-entering with a new user request 204, the user request is placed at the end of the queue, with a new calculated wait time. This prevents users from circumventing the on-line wizard manager 200 and discourages user attempts to circumvent the manager. Once at the wizard 202, the user interacts with the wizard according to whatever functions the particular wizard requires.

Returning to the waiting queue determination 208, if the queue is not already populated, the user request 204 is directed by entry point 206 to a load calculator 214. At the load calculator, the entry point determines whether the new user request 204 should be placed in a waiting queue because the current server load is too high. If the server load is below a pre-determined threshold, the user request 204 is routed to the on-line wizard 202. If the server load is above the pre-determined threshold, the user request 204 is routed to the wait-time calculator 210.

The load calculator is further described with reference to FIG. 3. As shown in FIG. 3, the load calculator measures the average server load, as shown at 216. The measurement is performed in any of a number of known ways. For example, the average CPU utilization, the current memory usage, or the number of memory page faults can all be used as a basis for determining the load on a server. The load value that is measured is stored in a database and is updated periodically, as shown at 218. The time period for the updates is configurable. As one example, and without limitation, the update time period could be ten seconds. Once measured and updated, the server load is scaled, as shown at 220. This function is optional and merely converts the server load into a more-usable number. As an example, the load can be scaled to represent a number between zero and one-hundred, where zero represents no server load and one-hundred represents the maximum load. The scaled load value is then compared to a load threshold, as shown at 222. For example, the load threshold can be set at seventy-five, representing a server load that is 75% of the maximum load. The load threshold is set at a value that allows the server to provide the user a good experience with no server errors. If the load is above the load threshold, it is passed along to determine if the server load is above the load threshold for a duration threshold time period, as shown at 224. The duration threshold is also configurable and can be set at a value that discounts temporary load spikes. As an example and without limitation, the duration threshold can be set at thirty seconds. If the load is above the load threshold for the duration threshold, the user request 204 is delivered to the wait time calculator 210. The user request in this instance becomes the first user request in the wait queue. The operation of the wait time calculator 210 and the wait page 212 operate as described above. But if the load is below the load threshold or is above the load threshold for less than the duration threshold, and if a wait queue does not exist, the user request is delivered to the wizard 202.

In use, the present invention increases the likelihood of a positive user experience with on-line wizard 202. Requests to enter the wizard 202 are managed by the on-line wizard manager 200. In this management, new user requests 204 are allowed into the wizard 202 only when the server load is below a level needed to give the user a good experience. If the server load is above this level, the user requests are placed in a queue and the user is informed of the wait and its duration. Once the wait time expires, the user request is automatically routed to the wizard. The use of the manager 200 reduces the number of server time-outs and server errors. In this way, users are more likely to have a positive experience and are more likely to return to the wizard 202. The wizard mangager 200 can be implemented as a part of the wizard 202 or can be implemented as a part of an operating system, or as a separate application.

The present invention has been described in relation to particular embodiments, which are intended in all respects to be illustrative rather than restrictive. Alternative embodiments will become apparent to those skilled in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and within the scope of the claims.

What is claimed is:

1. A computer-implemented method for regulating the flow of users into an on-line wizard, comprising:
    measuring the load experienced by one or more servers associated with the on-line wizard in the one or more servers;
    accepting a new user request at an online wizard manager in the one or more servers to access the on-line wizard; and
    based upon the measured load, determining whether access to the on-line wizard should be granted immediately or delayed for a period of time.

2. The computer-implemented method of claim 1, further comprising, establishing a queue of user requests if access to the on-line wizard is delayed for a period of time.

3. The computer-implemented method of claim 2, further comprising, calculating the length of delay required before access to the on-line wizard is granted, the length of delay being a function of the measured load, the number of user requests in the queue and the performance of the one or more servers.

4. The computer-implemented method of claim 3, further comprising, displaying to a user associated with the new user request the calculated delay.

5. The computer-implemented method of claim 4, further comprising, dynamically displaying the calculated delay remaining to the user.

6. The computer-implemented method of claim 2, further comprising, prior to said determining step, detecting whether a queue of user requests already exists and if so, adding the new user request to the queue, and if not, continuing with the determining step.

7. The computer-implemented method of claim 4, further comprising, dynamically displaying the calculated delay remaining to the user wherein the calculated delay remaining is decreasing the waiting time.

8. The computer-implemented method of claim 1, wherein the determining step includes comparing the measured server load against a load threshold and a duration threshold, and delaying access to the on-line wizard if the measured server load is above the load threshold and the duration threshold.

9. A computer readable medium containing instructions for improving the performance of an on-line wizard, the instructions comprising:
    measuring the load experienced by one or more servers associated with the on-line wizard in the one or more servers;
    accepting a new user request at an online wizard manager in the one or more servers to access the on-line wizard; and
    based upon the measured load, determining whether access to the on-line wizard should be granted immediately or whether access to the on-line wizard should be delayed for a period of time.

10. The computer readable medium of claim 9, further comprising, establishing a queue of user requests if access to the on-line wizard is delayed for a period of time.

11. The computer readable medium of claim 10, further comprising, calculating the delay required before access to the on-line wizard is granted.

12. The computer readable medium of claim 11, further comprising, displaying to a user associated with the new user request the calculated delay.

13. The computer readable medium of claim 12, further comprising, dynamically displaying the calculated delay remaining to the user.

14. The computer readable medium of claim 10, further comprising, prior to said determining step, detecting whether a queue of user requests already exists and if so, adding the new user request to the queue, and if not, continuing with the determining step.

15. The computer readable medium of claim 12, further comprising, dynamically displaying the calculated delay remaining to the user wherein the calculated delay remaining is decreasing the waiting time.

16. The computer readable medium of claim 9, wherein the determining step includes comparing the measured server load against a load threshold and a duration threshold, and delaying access to the on-line wizard if the measured server load is above the load threshold and the duration threshold.

17. A management system for controlling access to an on-line wizard, comprising:
    a computer having a memory; and
    an on-line wizard manager executable on the computer to control access to the on-line wizard based upon the load of one or more servers associated with the on-line wizard.

18. The on-line wizard management system of claim 17, wherein the on-line wizard manager includes an entry point component and a wait page component.

19. The on-line wizard management system of claim 18, wherein the entry point component creates a queue of wizard access requests if the measured load on the one or more servers is above a pre-determined load threshold for a pre-determined duration threshold and wherein the queued access requests are managed by the wait page component.

20. The on-line wizard management system of claim 19, wherein the entry point component grants direct access to the on-line wizard if the one or more servers is below the pre-determined load threshold, or above the pre-determined load threshold but for less than the pre-determined duration threshold, and if a queue of access requests does not already exist.

* * * * *